UNITED STATES PATENT OFFICE.

CARL HEIDENREICH, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

DIAZOTIZABLE DYE.

1,009,745.  Specification of Letters Patent.  Patented Nov. 28, 1911.

No Drawing.   Application filed April 25, 1911.   Serial No. 623,205.

*To all whom it may concern:*

Be it known that I, CARL HEIDENREICH, doctor of philosophy, chemist, citizen of the German Empire, residing at Leverkusen, near Cologne, Germany, have invented new and useful Improvements in Diazotizable Dye, of which the following is a specification.

Green substantive dyestuffs capable of being diazotized could hitherto not been obtained, though they are of great technical interest for completing the series of shades and for modifying the shades produced by other dyestuffs capable of being diazotized. I have now succeeded in obtaining such dyes capable of dyeing cotton green to olive green shades in the following way. 1 molecule of a tetrazotized para-diamin of the benzidin series and 1 molecule of an aromatic oxycarboxylic acid such as salicylic or cresotinic acid are combined together to form the intermediate compound which is then further combined with 1.8-aminonaphthol-4-sulfonic acid in an acid suspension. The resulting coloring matter is then combined in alkaline solution with the diazo compound prepared from acidyl-para-phenylenediamin or from para-nitranilin and finally the trisazo dyestuff is saponified or the nitro group therein contained reduced. The dyestuffs thus obtained of the formula:

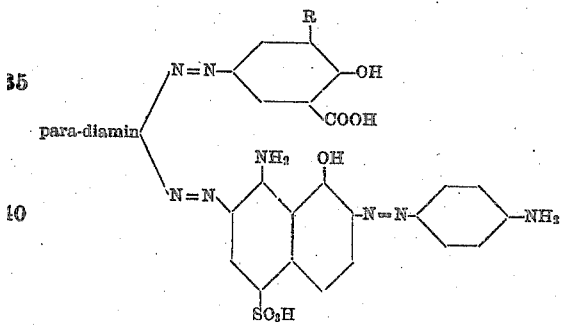

in which formula R means an atom of hydrogen which may be substituted by the methyl group, dye cotton in green shades, which, on being diazotized and developed with beta-naphthol or meta-phenylenediamin, are very little changed, but are rendered fast to washing by this process. They are dark powders yielding upon reduction with stannous chlorid and hydrochloric acid a para-diamin of the benzidin series, an amino-oxycarboxylic acid, 1.2.7-triamino-8-naphthol-4-sulfonic acid and para-phenylenediamin.

In order to illustrate the new process more fully the following example is given, the parts being by weight:—The intermediate compound prepared in the usual way from 18.4 parts of benzidin and 14 parts of salicylic acid, is rendered just acid with hydrochloric acid and is introduced into an acid suspension of 24 parts of 1.8-aminonaphthol-4-sulfonic acid. The mixture is stirred for 24 hours, the free mineral acid being carefully neutralized during this operation with sodium acetate. The diazo compound obtained in the usual way from 18 parts of para-phenylenediamin oxaminic acid is added to this mixture and it is then rendered distinctly alkaline with sodium carbonate solution. After 6 hours the mixture is heated to 70° C. and the dyestuff is salted out and filtered off. It is then stirred up with 500 parts of water and heated to boiling for half an hour with 120 parts of caustic soda lye containing 30 per cent. of NaOH. Subsequently the caustic soda lye is partially neutralized and the dyestuff is salted out, filtered off and dried. It has the formula:

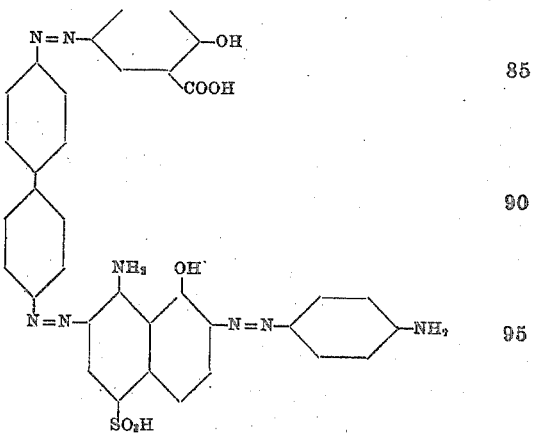

and is a dark powder which is soluble in water with a green color and dyes cotton in green shades which on being diazotized and combined with beta-naphthol turn into a somewhat darker green of good fastness to washing. It yields upon reduction with stannous chlorid and hydrochloric acid benzidin, para-aminosalicylic acid, 1.2.7-triamino-8-naphthol-4-sulfonic acid and para-phenylenediamin. It is soluble in conc. sulfuric acid with a violet-black color.

Instead of benzidin other diamins can be used, such as tolidin, dianisidin etc.

I claim:—

1. The herein described new dyestuffs of the formula

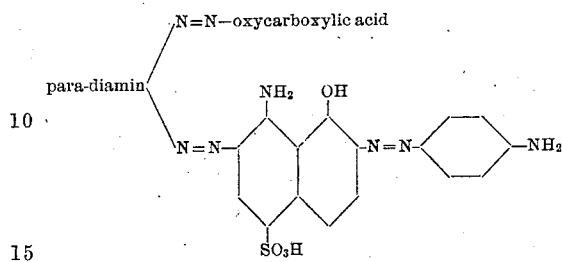

which dyestuffs are after being dried and pulverized dark powders soluble in water and in concentrated sulfuric acid; yielding upon reduction with stannous chlorid and hydrochloric acid a para-diamin of the benzidin series, an amino-oxy-carboxylic acid, 1.2.7-triamino-8-naphthol-4-sulfonic acid and para-phenylenediamin; dyeing cotton in green shades fast to washing, which can be diazotized and developed with beta-naphthol, substantially as described.

2. The herein described new dyestuffs of the formula

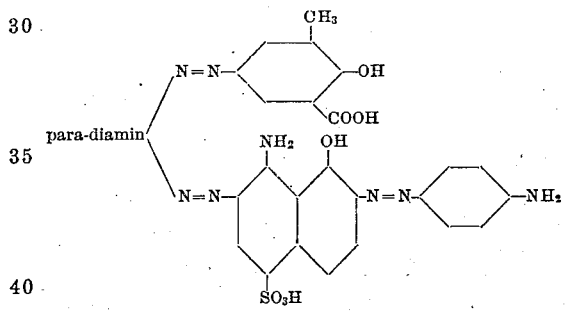

which dyestuffs are after being dried and pulverized dark powders soluble in water and in concentrated sulfuric acid; yielding upon reduction with stannous chlorid and hydrochloric acid a para-diamin of the benzidin series, an amino-oxy-carboxylic acid, 1.2.7-triamino-8-naphthol-4-sulfonic acid and para-phenylenediamin; dyeing cotton in green shades fast to washing, which can be diazotized and developed with beta-naphthol, substantially as described.

3. The herein described new dyestuff of the formula

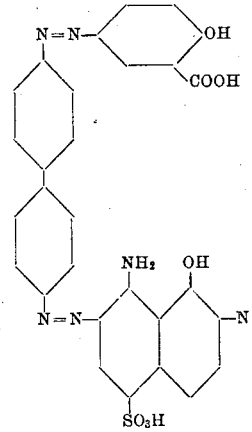

which dyestuff is after being dried and pulverized a dark powder soluble in water with a green color and soluble in concentrated sulfuric acid with a violet-black color; dyeing cotton in green shades which on being developed with beta-naphthol turn into a darker green of good fastness to washing; yielding upon reduction with stannous chlorid and hydrochloric acid benzidin, para-aminosalicylic acid, 1.2.7-triamino-8-naphthol-4-sulfonic acid and para-phenylenediamin, substantially as described.

In testimony whereof I have hereunto set my hand in the presence of two subscribing witnesses.

CARL HEIDENREICH. [L. S.]

Witnesses:
 CHAS. J. WRIGHT,
 ALFRED HENKEL.

Copies of this patent may be obtained for five cents each, by addressing the "Commissioner of Patents, Washington, D. C."